April 19, 1966 F. S. MORGAN 3,246,905
APPARATUS AND METHOD FOR SUPPORTING VARIABLE STATIC
LOADS BY FLUID PRESSURE SPRING-SHOCK ABSORBER MEANS
INCLUDING THERMOELECTRICALLY CONTROLLED VAPOR
PRESSURE VARYING MEANS AND LOCK-OUT
Filed April 11, 1963 2 Sheets-Sheet 1
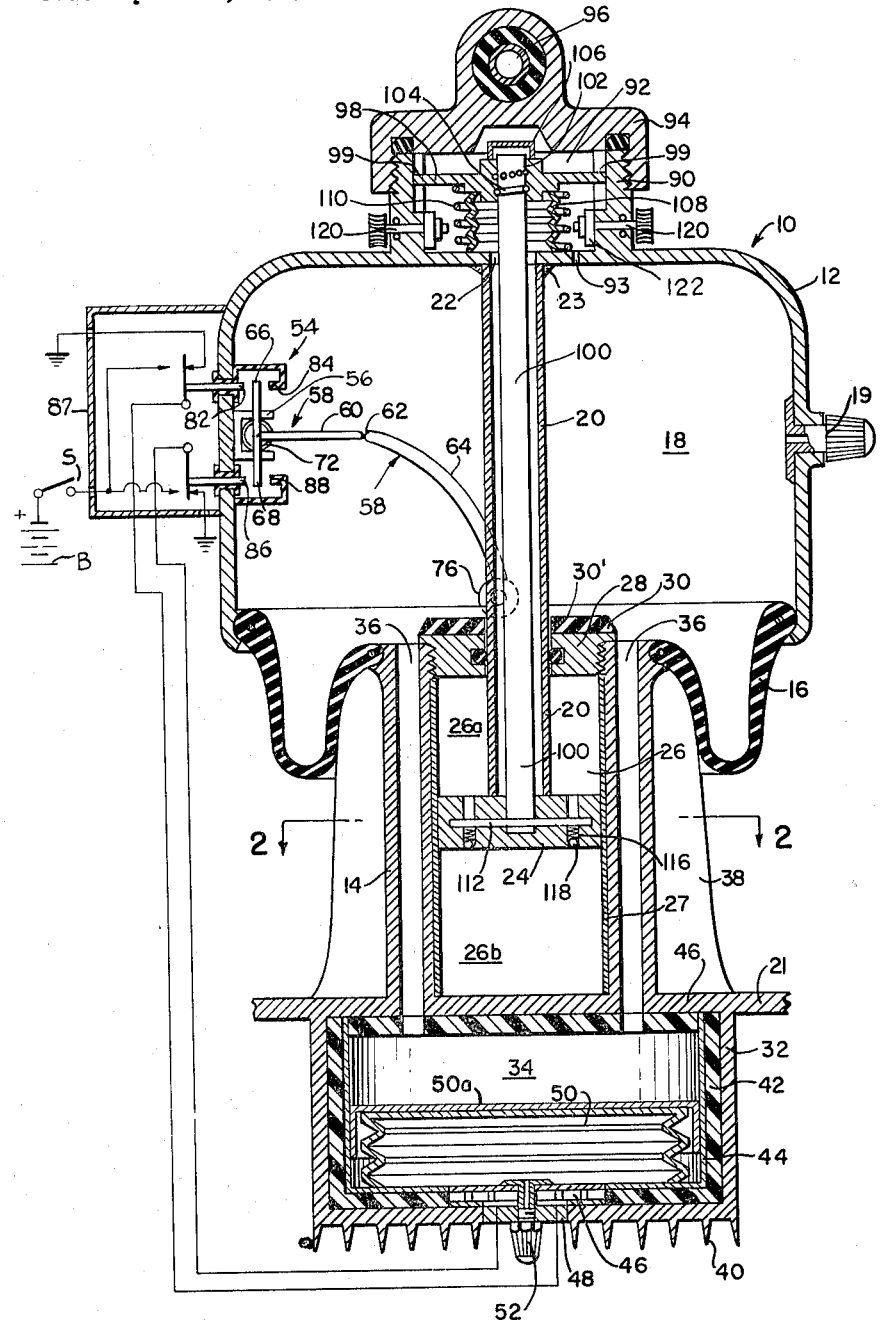
FIG. I.
INVENTOR
Frank S. Morgan
BY
ATTORNEY April 19, 1966
F. S. MORGAN
3,246,905
APPARATUS AND METHOD FOR SUPPORTING VARIABLE STATIC
LOADS BY FLUID PRESSURE SPRING-SHOCK ABSORBER MEANS
INCLUDING THERMOELECTRICALLY CONTROLLED VAPOR
PRESSURE VARYING MEANS AND LOCK-OUT
Filed April 11, 1963
2 Sheets-Sheet 2
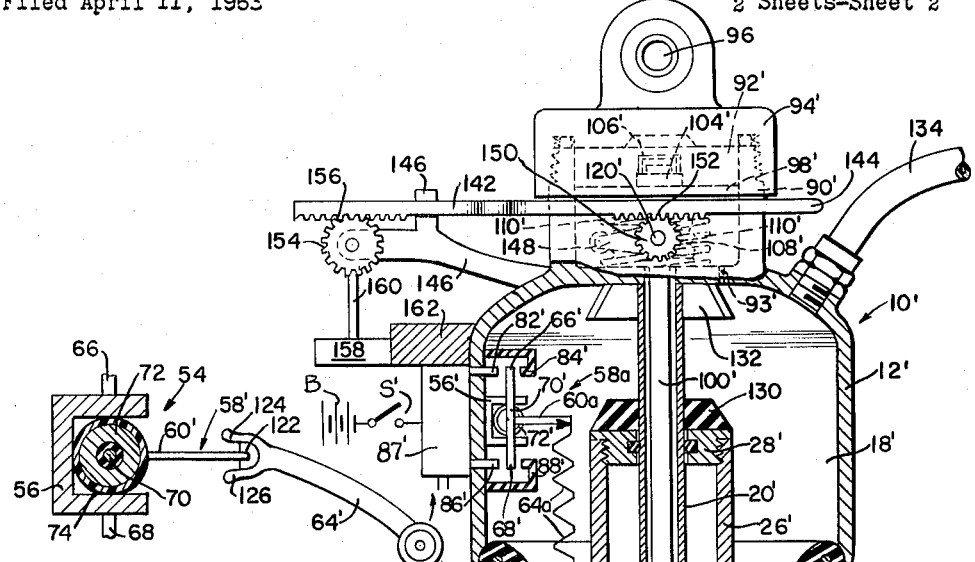
FIG. 4.
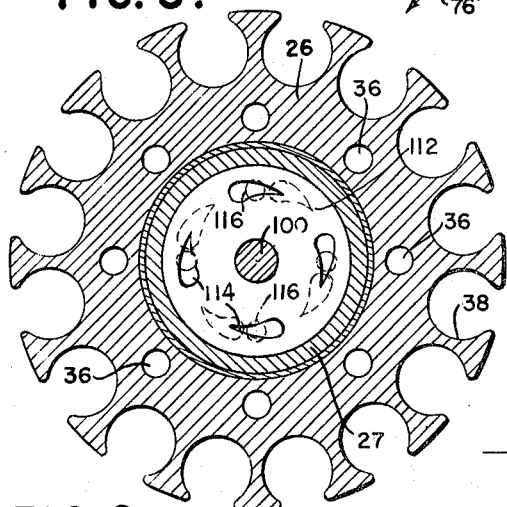
FIG. 3.
FIG. 2.
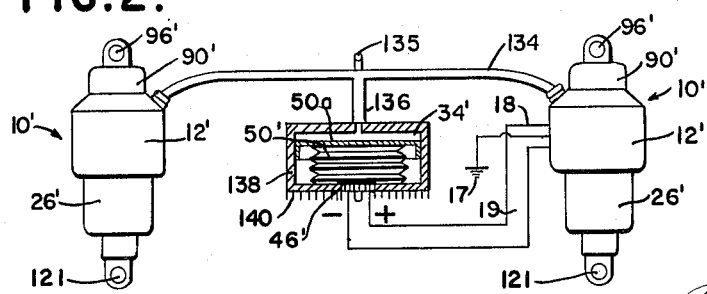
FIG. 5.
INVENTOR
Frank S. Morgan
BY Frank S. Morgan
ATTORNEY

United States Patent Office 3,246,905
Patented Apr. 19, 1966

3,246,905
APPARATUS AND METHOD FOR SUPPORTING
VARIABLE STATIC LOADS BY FLUID PRESSURE
SPRING-SHOCK ABSORBER MEANS INCLUDING
THERMOELECTRICALLY CONTROLLED VAPOR
PRESSURE VARYING MEANS AND LOCK-OUT
Frank S. Morgan, 5405 N. 27th Road, Arlington, Va.
Filed Apr. 11, 1963, Ser. No. 272,462
35 Claims. (Cl. 280—6)

The present invention related to Apparatus and Method for Supporting Variable Static Loads by Fluid Pressure Spring-Shock Absorber Means Including Thermoelectrically Controlled Vapor Pressure Varying Means and Lock-Out Control Means, and has for an object to provide improvements over my copending applications, Serial No. 187,295, filed April 13, 1962; Serial No. 199,899 filed June 4, 1962 and Serial No. 204,099 filed June 21, 1962, all now abandoned.

As an illustration of the application of the principles of my invention, for example, in the engineering design of vehicle suspension systems heretofore it has been found necessary to effect a compromise between the ideal suspensions for light and heavy vehicle loadings. The spring suspension means and associated shock absorber mechanism designed to suspend and dampen out vertical oscillations of the lightly loaded vehicle prove to be entirely inadequate and ineffective when relatively heavy loadings are involved. Conversely, when designed or adjusted for relatively heavy loads the vehicle suspension-shock absorber mechanism proves too stiff and hard when the vehicle is lightly loaded.

Numerous attempts have been made to overcome this dilemma in the automotive art. Shock absorber mechanisms have been used wherein variable fluid flow through the restrictive orifices of the shock absorber has been provided under control of automatic control means responsive to variations of both the static and dynamic pressures of a variable rate spring suspension system such as disclosed in the U.S. Patent to Vogel, 3,036,844. Another method, as taught by the Schnitzer U.S. Patent 2,866,633 employs only the dynamic pressures created by the compression and rebound strokes of the shock absorber to vary the flow through a fixed area orifice by employing a flexible bellows to spring load a cylindrical valve having a tapered metered portion but with no reference or relationship to the static pressure of the fluid spring suspension system. Neither of these methods adequately meet the requirements of a truly variable rate flow shock absorber which, to adequately function under infinitely varying loading conditions must be capable of automatically providing comparably infinitely variable damping action settings responsive only to the changes in static loading of the vehicle as they occur.

The present invention, as applied to vehicular suspension systems, provides a novel vehicle suspension system having novel control means whereby the static pressure of the fluid spring automatically and infinitely varies the area of multiple fluid flow orifices in the shock absorber component thereof proportional solely to changes in the static pressure in the fluid spring means incident to changes in the loading of the vehicle. For a given loading on the vehicle, the area of the fluid flow restricting orifice means of the shock absorber remains constant throughout the dynamic pressure changes resulting from compression and rebound strokes and is not affected or modified by any sudden dynamic increase or decrease in fluid spring pressure, or by differential pressures acting on the movable piston of the shock absorber occasioned by road-imposed impacts. However, under slow or gradual changes in the static pressure of the fluid spring means brought about by changes in the load carried by the vehicle, the areas of the restricting orifices automatically vary in direct proportion to such changes in the vehicle static loading.

It is accordingly a primary object of the invention to disclose a novel system, method, mechanism, arrangement or apparatus for resiliently supporting a variable load between two relatively movable members and employing a fluid spring means pressure responsive to a confined thermally reactive gas subject to thermal variance by a thermoelectric heat pump and further controlled by a restricted orifice-type hydraulic shock absorber; the action of both the spring and shock absorber being automatically responsive and infinitely variable, between predetermined limits, in proportion to changes in the static loading on the fluid spring means.

It is another object of this invention to disclose a vehicle suspension which provides uniform operating characteristics for a given vehicle loading with control mechanism incorporated therein which provides automatic adjustment of such characteristics with each change in vehicle static loading to maintain over-all uniform suspension or ride characteristics at all times.

It is a further object of the invention to disclose a vehicle suspension incorporating a damping mechanism having means for controlling the damping action and automatically adjustable to an infinite number of settings of damping action, said settings being made simultaneously with and conforming to the infinite range of changes in static loading of the vehicle, to maintain uniform suspension characteristics regardless of the changes in vehicle static loading.

It is still a further object of the invention to disclose a combined fluid suspension spring and shock absorber structure for vehicles as described above, wherein all control mechanism is sealed within the structure and not subject to tampering and substantially free from external damage.

It is also another object of the invention to disclose a combined fluid suspension spring and shock absorber structure as herein described which has a lock-out mechanism to automatically effect rigid vehicle support by the shock absorber in the event of partial or complete failure of pressure in the fluid spring, and wherein means are provided to manually adjust the structure to render the vehicle sprung load spacially rigid when desired for loading or any other use requiring a rigid suspension.

It is also an additional object to disclose a combined arrangement of unitary fluid suspension spring and hydraulic shock absorber units comprising a supporting system for vehicles wherein the fluid pressure and control action is automatically adjustable to each change in vehicle static loading to maintain uniform system operating characteristics regardless of the change in vehicle static loading and wherein the system employs a common source of condensible gas in the system to effect variable changes in fluid spring pressure in the system in conformity with change in static loadings.

It is yet another object to disclose a system of unitary fluid pressure springs and hydraulic shock absorber structures as aforesaid wherein inertia weight means automatically adjust the structures to minimize side sway of the vehicle when deviating from a straight line movement and particularly during sharp cornering of the vehicle.

A final object of this invention is to provide a novel multiple-chamber construction of the fluid spring casing in one chamber of which there is a flexible bellows, preferably of metal construction, containing condensable gas, which bellows, when fully contracted, provides a minimum volume to which it can contract, such as when the system is permitted to remain inoperative at a temperature which is below that necessary to maintain the condensable gas in said chamber at a pressure equal to the design pressure of the liquid spring. Conversely, when the system is permitted to remain inoperative in a temperature above that necessary to maintain the condensable gas in said bellows chamber at a pressure equal to the design pressure of the system, the configuration of the non-condensible gas containing chamber in which the flexible bellows is contained is such as to limit the extension of the bellows and therefore limit the pressure in the system.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a vertical sectional view of the thermoelectrically controlled vapor pressure spring and shock absorber forming a vehicle suspension mechanism unit.

FIGURE 2 is a horizontal sectional view taken through the shock absorber component on line 2—2 of FIGURE 1.

FIGURE 3 is a vertical sectional view on enlarged scale of a detail of the height sensing device incorporated in the suspension mechanism unit incorporating a modification thereof.

FIGURE 4 is a vertical sectional view, partly in elevation, similar to FIGURE 1 of a modification of the vehicle fluid suspension unit.

FIGURE 5 is a schematic showing of a plurality of the vehicle suspension units of the form shown in FIGURE 4 having a common thermoelectrically controlled means for simultaneously modifying the static fluid spring pressure of a pair of suspension units.

Referring now to the drawings, and particularly to FIGURE 1 wherein the vehicle suspension unit, generally designated 10, comprises an inverted rigid cup-like fluid spring casing 12 or relatively large diameter. A cylindrical hydraulic shock absorber casing 14 of a relatively smaller diameter, is positioned below and in free telescoping relation to the fluid spring casing 12. A suitable flexible diaphram closure 16 is secured in sealed relation both to the open lower end of the spring casing 12 and upper end of the shock absorber casing 14 and forms a closure for the space between the two casings. A suitable valve means 19 is provided in the wall of the chamber 18 for charging it with a gaseous medium, such as air, under a pre-determined pressure. Suitable bracket means 21 is provided on casing 14 for mounting purposes on one of the sprung and un-sprung parts of the vehicle.

A tubular piston rod 20, rigidly secured centrally to casing 12 about an opening 22 by means of a weld 23 or the like, extends downwardly through the fluid spring chamber 18 and has a shock absorber piston 24 secured thereto at its lower end. Piston 24 is slidable in a vertically positioned cylinder 26 of the hydraulic shock absorber casing 14 forming upper and lower compression spaces 26a and 26b, respectively, therein. A liner or sleeve 27 formed, for example, of steel, is mounted in the cylinder 26 for wear resistance purposes. The upper end of cylinder 26 is closed by a closure member 28 through which the tubular piston rod 20 extends in sealing relation thereto by means of a suitable packing. The upper surface of closure 28 is flat and has secured thereon an insulating member 30 having a correspondingly flat bearing surface 30′ the purpose of which will be later described.

The cylindrical shock absorber casing 14, which is formed of a high heat conductive material, such as aluminum for example, has formed at its base or lower end an enlargement 32 providing a chamber 34, preferably cylindrical in shape, having communication with the chamber 18 in casing 14 by means of a plurality of ducts 36 in the wall of the vertical cylinder 26. The casing 14 is provided with a plurality of heat dissipating fins 38 of relatively large size formed integrally with the cylinder portion 26 while comparable fins 40 are provided on the bottom exterior of the enlargement 32 to form a heat sink for thermoelectric heat pump 46 which will be described later in detail.

The cylindrically shaped chamber 34 has an insulating liner 42 of suitable material, such as silicon rubber for example, on all of the interior wall surfaces therein and overlying the insulating liner 42 on the side and bottom surface portions is a thin heat dissipating metallic liner 44 formed of copper, for example, having intimate contact with the upper wall portion 46 of the chamber 34. Mounted in the bottom wall portion of chamber 34 and extending through both liners 42 and 44 is a thermoelectric heat pump 46 secured in position by an insulating mounting element 48 extending to the exterior of the chamber 34. A flexible metal static pressure regulating sealed bellows 50, into which thermo-electric heat pump 46 is exposed, is mounted in over-lying relation thereto and sealingly secured to the heat dissipating metallic liner 44 of the chamber 34. Secured to the top of the bellows 50 is a piston-shaped cap 50a having a peripheral flange of a length slightly greater than the length of the bellows when collapsed so as to sealingly seat on the bottom of chamber 34 to protectively enclose the bellows when the pressure in the bellows 50 is less than the designed minimum pressure of the fluid spring. Valve means 52 is the module mounting element 48 for charging the bellows 50 with a quantity of condensible gas in both liquid and vapor stages.

Mounted interiorly of chamber 18 and on the side wall of the fluid spring casing 12 is a height sensing and static fluid pressure control device 54. It comprises a U-shaped permanent magnet 56 within which is pivotally mounted a relatively arcuate shaped sensing and static position controlling arm or wand member 58 controlling a conventional reversing switch 87 electrically connected to a conventional storage battery B by means of a primary control switch S. Member 58 is formed from a comparatively thin strip of substantially stiff but resilient spring steel, the upper end portion 60, as shown in FIGURE 1, being disposed with its width substantially horizontal, the strip being twisted at 62 to position its width in a vertical plane to form an actuating arm portion 64.

The pivotal end of member 58 is T-shaped, the T portion, integral with portion 60, forming upper and lower electrical contact arms 66 and 68, respectively. Insulating but drivingly mounted on a pin 70 integral with the T end portion and extending rectilinearly therefrom is a ferrous or iron roller armature 72 rotatably mounted within a nylon bearing 74 the outer race of which is in frictional bearing contact with the inside surfaces of the U portion of the magnet 56. The twisted or free end actuating arm portion 64 has a roller 76 mounted on its lower end which is in bearing contact with the flat insulated surface 30′ of the insulating member on the shock absorber cylinder end closure 28.

Contact actuator arm 66 is adapted to make electrical contact at one end of the pivotal movement of the member 58 with a contact closing member 82 of a conventional, suitably grounded, reversing switch 87 while arm 68 similarly actuates another contact closing member 86 of the reversing switch 87 at the other end of its pivotal movement. The contacts 82 and 86 are electrically connected, via the reversing switch, to the thermo-electric heat pump 46 in the bellows chamber 50. Insulated abutments 84 and 88, spaced from and in alignment with contact closing members 82 and 86, respectively, prevent armature roller 72 from being displaced from its U-shaped magnet 56.

The fluid spring casing 12 at its upper exterior end has an upstanding tubular extension 90 integral therewith forming a cylindrical valve control chamber 92 therein in communication with the tubular piston rod, containing air at substantially atmospheric pressure, by way of the opening 22. Chamber 92 is likewise in constant communication with the fluid spring chamber 18 by means of a very small restricted flow passage 93, the control chamber 92 constituting part of a fluid chamber means for adjusting the flow controlling valve 112 in the shock absorber piston. A closure 94 is threadedly secured on the upper end of the tubular extension 90 with suitable packing therebetween to sealingly close the control chamber 92 to the atmosphere. Suitable means 96 are provided on closure 94 for securing the upper end of the suspension unit to the sprung portion of the vehicle.

A valve controlling disc piston member 98 is splined at 99 to the cylindrical wall of control chamber 92 to move vertically and non-rotatively therein but with sufficient peripheral clearance for the flow of gaseous fluid from one to the other side thereof. The upper end of a valve actuating rod 100 is rotatively mounted in an axial bore 102 of the piston 98 by means of an anti-friction helical, ball-screw means 104. A cap closure 106 is secured over the axial bore 102 of the piston 98 to prevent flow of any fluid from chamber 92 therethrough. A flexible bellows seal 108 is connected between the underside of piston 98 and the bottom wall of control chamber 92 to likewise prevent any flow of fluid from the hollow piston rod 20 into chamber 92. A compression spring 110 in surrounding relation to the bellows seal 108 yieldingly supports the piston 98 in an initially pre-set position.

The lower end of valve rod 100 has a circular thin disc valve 112 fixedly secured thereon, the valve disc having a plurality of equally spaced arcuately-extending teardrop-shaped flow-metering orifices 114 therein, such as four for example, as clearly shown in FIGURE 2, aligned with and controlling fluid flow in a corresponding number of through-flow passages 116 in the hydraulic shock absorber piston 24. Two of the piston passages 116, as shown in FIGURE 1, have spring-pressed ball valves 118 closing them to flow of hydraulic fluid upwardly from below piston 24 while the remaining two piston passages are free of ball check valves, fluid flow therethrough being controlled solely by the contoured metering passages 114 of disc valve 112 having pre-determined flow resistance characteristics.

Rotatably mounted in the wall of the extension 90 forming the control chamber 92 on the top of the fluid spring casing 12 are manually operable rotary lock-out devices 120 operable exteriorly of the extension 90 and at a remote point if desired. Lock-out devices 120 have cam means 122 thereon in the chamber 92 which are adapted to be rotated to raise the piston 92 therein when desired, for reasons to be later explained.

Before mounting the unit 10 on a vehicle the shock absorber cylinder 26 is substantially filled with a suitable hydraulic liquid, but with sufficient air in the cylinder to compensate for displacement thereof by the piston rod and the fluid spring chamber 18 has air admitted thereto through valve 19 to a design height pressure of 60 p.s.i., for example. Likewise, a suitable condensible gas, such as methyl chloride, in both liquid and gaseous form, is admitted through valve 52 into the air spring static pressure regulating bellows 50. The pressure of the air in the spring chamber 18 is transmitted via ducts 26 down into chamber 34 which encloses the static pressure controlling bellows 50.

The manner in which the suspension unit 10 functions is as follows: Since the application of this load supporting mechanism invention, to be used on vehicles, takes the place of the conventional spring suspension and shock absorber means of a vehicle, it will be assumed that the lower mounting bracket 21 will be suitably secured to the unsprung wheel or axle structure while the upper mounting means 96 is suitably secured to the sprung part of the vehicle with the unit 10 positioned in preferably a vertical position. It will be further assumed that the loading of the vehicle sprung mass is a mean loading such that with the vehicle stationary the parts assume approximately the relative positions shown in FIGURE 1 with the shock absorber piston 24 statically positioned in the mean or mid position shown.

When the vehicle with the disclosed suspension is under way, with the sprung portion resiliently supported by the compressed air in chamber 18 of casing 12, if the vehicle wheel suddenly strikes a road obstruction the shock absorber cylinder 26 suddenly moves upward relative to its piston 24. Hydraulic liquid then flows therein substantially freely from the space 26b below the piston through all four piston passages 116 to space 26a above the piston, since the fluid pressure at this time unseats the two ball check valves 118 providing very little, if any, resistance to upward cylinder movement. At the same time, the sudden or rapid upward movement of the cylinder thrusts against actuating arm 64 via its bearing roller 76, causing it to roll along surface 30' of cylinder closure insulating member 30. Since the cylinder movement is rapid, as stated, the flux control of the magnet 56 will prevent rotation of the ferrous roller armature 72 to thereby maintain the members 66, 68 in the normal mid-position shown. However, by reason of its resiliency and the manner in which it is positioned, horizontal arm portion 60 of wand member 58 is flexed upwardly by the movement imparted to the substantially vertically positioned actuating arm portion 64 of member 58 without overcoming the holding action of the magnet and associated iron roller armature nylon bearing means 74.

As rebound movement follows with relative separation of the piston and cylinder the piston check valves 118 seat, thereby restricting fluid flow back to cylinder space 26b from space 26a via the other two passages 116 controlled solely by their disc valve control orifices 114. The restriction of fluid flow through these two passages effects a degree of retardation or shock absorbing action to the rebound movement which occurs between the piston 24 and cylinder 26 and parts of the vehicle associated therewith, depending on the rotary setting of the disc valve 112. At the same time the flexure in sensing arm portion 60 maintains roller 76 in contact with surface 30' on the cylinder closure insulator 30 causing it to roll thereon back to its initial position. Should the road wheel suddenly meet a depression in the road surface a similar action in reverse order takes place since initially a separation of the vehicle parts takes place, the piston 24 relatively moving upward in shock absorber cylinder 26 and then downwardly. As the cylinder 26 rapidly moves downwardly from the FIGURE 1 position the iron or ferrous roller 72 of the sensing unit 54 is held stationary in the same manner as before, the weight of the arm portions 60, 64 and bearing roller 76 attached thereto, acting as a cantilevered beam, causing a downward flexure to obtain in the vertically flexible arm portion 60, permitting roller 76 to follow the cylinder downwardly as it rolls along surface 30' thereof. During the rapid upward return of cylinder 26 to its normal static position, very little, if any, retardation or resistance to such movement obtains since at this time all four piston passages 116 are open, the check valves 118 being unseated by the greater fluid pressure in cylinder space 26b. The sensing device 54 then returns to the position shown by the removal of the flexure in arm portion 60 as the vertically rigid arcuate arm portion 64 and its roller 76 are thrust upwardly by the corresponding movement of the cylinder 26.

During the relatively rapid movements that take place in the suspension device while the vehicle is in motion, as above described, no appreciable flow of compressed air from air spring chamber 18 to the valve control chamber 92 occurs by reason of the highly restrictive nature of orifice 93. However, when conditions are relatively static for an appreciably greater time interval flow does obtain if a differential pressure condition exists.

Assume that with the vehicle stationary the vehicle loading is materially increased thereby causing the air under static pressure in the fluid spring to permit a slow downward deflection of the air spring casing 12 relative to the absorber cylinder 26 and thereby lowering the mean static position of the vehicle sprung load at its point of connection 96 with the suspension unit. This relatively slow downward movement of casing 12 causes a relatively slow upward counter-clockwise movement of the entire arm 58 of the sensor device 54 since the shock absorber casing is at this time vertically stationary. Since the resulting slow rotation of the ferrous roller 72 is not appreciably resisted by the lines of flux of the magnet 56, in view of the very slow cutting of its magnetic lines of flux no flexure of arm portion 60 takes place. As a result, the electrical contact closing member arm 66 engages spring-loaded mechanical contact 82, current then flowing from the battery B through reversing switch 87 to the thermoelectric heat pump 46 and then to the ground causing a heating of the upper surface thereof in contact with the condensible gas in the bellows 50. The resulting heating of the gas vaporizes a greater portion of the liquified gas in the bellows 50 causing an increase of pressure therein and an expansion or enlargement thereof. This enlargement of the bellows 50 effects an increase in pressure of the pressurized air in chamber 34 which is transmitted to chamber 18 by way of the casing passages 36. Pressure thus continues to build up in chambers 50 and 18 until such time as the resulting increased pressure causes a slow relative separation of the two casings 12 and 14, i.e. the upward movement of the air spring casing 12, as to return the sprung vehicle mass at its point of connection 96 with the unit to its initial previous elevational static position. At this point the electrical circuit at spring-loaded mechanical contact closing member is broken by the contact arms 66, 68 being returned to the position shown in FIGURE 1 through the relative lowering of the cylinder 26 and its roller surface 30′ and the resulting clockwise movement of arm 58 and its roller 76 to the illustrated position.

As the air pressure is thus relatively slowly increased in air chambers 18 and 34 a flow of the air under the increased pressure takes place through the constantly open restricted orifice 93 into control chamber 92 in the spring casing extenison 90 to force disc piston 98 slightly downwardly, due to the differentially effective areas thereof in proportion to the increase in pressure. Since piston 98 is prevented from rotating by splines 99, such downward movement actuates ball-screw device 104 to rotate valve 112, via its rod 100, counterclockwise in FIGURE 2 to increase the restriction of valve passages 116 by reducing the flow area of metering orifices 114. The position of disc piston 98 becomes stabilized as the opposing pressures on disc piston 98 come into balance.

When the vehicle loading is decreased, the air spring casing 12 slowly moves upward, or in effect, the shock absorber cylinder 26 and its bearing surface 30′ move relatively downwardly. The sensing arm 58 will, by its weight and the lessened resistance of armature 56 to rotation of the arm 58 under its now slow clockwise pivotal movement, as well as the relatively small holding effect of the nylon bearing 74, permit the ferrous roller 72 to correspondingly rotate clockwise to bring arm 68 of the T electrical contact arms 66 and 68 into engagement with spring loaded mechanical contact closing member 86. The electrical circuit thus established to the thermoelectric heat pump 46 in the bellows 50 causes a flow of current in a reverse direction from the flow when spring-loaded mechanical contact closing member 82 was engaged under increased loading, causing a cooling of the surface of the module 46 exposed to the interior of the bellows and a heating of its surface in contact with the wall of casing 32. The cooling action in the bellows cools the condensible gas therein and a resulting contraction or reduction in volume of the bellows 50 and therefore a resulting lowering of pressure of the fluid in the air spring in proportion to the reduction in vehicle loading. The fins 40 dissipate the heat generated in the outer portion of the module which is transmitted to fins 40. The lowered air pressure in chamber 18 of the fluid spring produces a corresponding lowered pressure in control chamber 92 by means of the flow established through wall aperture 93. This lowered pressure in chamber 92 causes a raising of disc piston 98 and rotation of the shock absorber piston valve 112 to increase the effective opening of the piston passages 116 thus reducing the shock absorbing action in proportion to the decreased vehicle static loading. As the connector 96 returns to its normal static elevation the engagement of roller 76 with the bearing surface 30′ causes the sensing arm 58 to rotate counter-clockwise to open the circuit at spring-loaded mechanical contact closing members 82, 86 and return to its static position as illustrated in FIGURE 1.

In order to prevent the suspension unit from more or less losing its support function in the event of a substantial or complete loss of its static fluid spring pressure, the bellows seal 108 will be extended by the pressure of spring 110, which ordinarily would be held in a contracted position by the pressure differential across the control after "shift" piston 98, to shift the latter to its uppermost or lock-out position to effect rotation of the piston valve 112 clockwise in FIGURE 3 to the position indicated therein in dot-dash lines to completely close the shock absorber piston passages 116. The shock absorber, under this condition, then functions as a rigid link and also can then function as a rigid support for the vehicle until normal fluid pressure conditions can be restored.

As an example of a further advantage of the lock-out mechanism, if a vehicle such as a truck, equipped with the load suspension system herein disclosed, is backed up to a loading platform where it is undesirable for the elevational level of the truck bed to vary during truck loading or unloading, by actuation of the lock-out devices 120 of the load suspension units 10 the truck body will be maintained at a fixed level until released after such loading or unloading operations.

The suspension unit inherently functions to prevent cavitation in the hydraulic liquid of the shock absorber. Since the static air pressure in control chamber 92 exerts a pressure on the bellows seal 108 therein, as is apparent from the showing in FIGURE 1, such pressure is transmitted to the interior of the piston rod 20 whereby it is transmitted laterally past piston valve plate 112 and into the hydraulic liquid in cylinder 26. Since a given amount of air at atmospheric pressure is initially provided in the cylinder 26 to accommodate for piston rod displacement during piston movements, the static pressure of the fluid spring transmitted to the hydraulic fluid in cylinder 26, as described, prevents cavitation or forming of air bubbles in the shock absorber fluid that would otherwise occur by the turbulence produced therein.

Since the hydraulic shock absorber portion of the suspension unit absorbs the kinetic energy of relative movement between the sprung and unsprung portions of the vehicle in performing its shock absorber function, it does so by converting it into heat energy. In order to maintain the operating characteristics of the present invention constant and substantially un-affected by the heat developed therein which tends to reduce the viscosity of the hydraulic fluid and thus its effectiveness, the shock absorber casing 14 is constructed of aluminum or the like having rapid heat conductive and dissipating qualities. It is further provided with relatively large heat dissipating fins 38 on the shock absorber cylinder portion and comparable fins 40 on the bottom of its chamber 34, the fins 40 comprising a heat sink tending to draw the heat or cold away from the thermoelectric heat pump to render it more efficient in operation.

Since it is apparent from the foregoing description all of the control components are sealed within the suspension-shock absorber unit which not only renders it automatic in adjusting to different conditions of operation but also render it tamper free and dependable in use.

FIGURE 3 illustrates a modified static position sensing arm construction 58' for unit 54. As here illustrated, the sensing-actuator arm 58' is formed of two arms portions 60' and 64' pivotally connected together by a lost motion connection 122. Arm 60' at its opposite end carries a T head having contact arm members 66 and 68 and is pivotally mounted in the magnet 56 in identically the same manner as in the FIGURE 1 embodiment. At its pivoted end-connection 122 the arcuate rigid actuating arm portion 64' has a forked configuration with two extensions comprising contact or bearing surfaces 124 and 126 spaced a short distance from the respective upper and lower sides of arm 60'. Arm portion 60' may be of a resilient spring steel construction with the extensions 124 and 126 of rigid arm portion 64' of corresponding rigid construction with the extensions 124 and 126 of arm portion 64' of a yieldingly resilient character.

In the operation of the suspension unit 10 with arm structure 58' replacing the arm structure 58 of FIGURE 1, with the arm portion 60 formed of resilient steel, vertical movements of the casings 12 and 14 (FIG. 1) within their normal range may take place without any pressure being exerted on arm portion 60' by bearing roller 76' moving in the same manner as roller 76. However, excessive relative compressive and or rebound movements of casings 12 and 14 will cause one or the other of the bearing surfaces 124 and 126 on rigid arm 64' to engage the arm portion 60' and move the electrical contact arms 66 and 68 into contact with either of spring-loaded mechanical contact closing members 82' or 86'. During any further pivotal movement of rigid arm portion 64' the resilient arm portion 60' yields under the contact pressure exerted by either of the bearing arms 124, 126 to flex and thereby permit such further pivotal movement of the arm portion 64'.

However, with the vehicle stationary and the loading thereon increased or decreased, the static position sensing arm 58' of FIGURE 3 provides a slight vertical free range static position of the connection 96 (FIGURE 1) of the sprung vehicle loading before the electrical circuit of the thermoelectric heat pump 46 is activated to heat (or cool) the condensible gas in the bellows cell 50 to thereby vary the air pressure in the fluid spring casing 12 which returns the sprung vehicle connection 96 to its initial mean or average static vertically spacial position. Obviously, the device would function in like manner with sensor arm portion 60' of rigid construction and the forked arm extension bearing members 124 and 126 of resilient construction such as when arm portion 64' comprises a strip of sheet spring metal positioned with its major width in a vertical plane and the extensions 124, 126 twisted at right angles thereto with their major widths in planes normal to the vertical plane.

FIGURE 4 illustrates a modified form of the suspension-shock absorber unit comprising one of a pair adapted to be used functionally together across one end, such as the rear end of a vehicle.

In FIGURE 4 the unit, designated 10' is similar to the 10 of FIGURE 1 and comprises an embodiment particularly adapted for use on relatively light weight vehicles, such as passenger cars, for example, while that of FIGURE 1 is particularly adapted for heavier vehicles, such as trucks, etc. As will be apparent on inspection, many of the component parts of the unit 10' in FIGURE 4 correspond very similarly to like parts in FIGURE 1. It will be noted the air spring casing 12' is of a smaller transverse section while the flexible lower end closure 16' therefor and the shock absorber cylinder 26' is longer in view of the lesser vehicle loading and softer riding qualities generally preferred in light weight vehicles. The cylinder 26', while not shown as having a cylindrical liner, may be provided with one if desired or the cylinder may be of a harder metal than aluminum if desired. A connection 121 for mounting the shock absorber cylinder 26' on the unsprung portion of the vehicle may be used in lieu of a bracket such as shown at 21 in FIGURE 1. The shock-absorber piston 24', its passages 116', and piston passage restrictor valve 112', as well as the actuator device for the piston passage control valve are identical to their counterparts in FIGURE 1.

In view of the desired softer ride qualities a rubber bumper or the like 130, preferably having a frusto-conical shape, is provided on the upper closure 28' of the shock absorber cylinder 26' the bumper being adapted to seat in a complementary shaped member 132 mounted directly above it on the inner surface of the upper wall of the fluid spring casing 12' inwardly of restricted aperture 93' to chamber 92' when an excessive compressive movement between the cylinder 26' and its piston 24' occurs.

The static fluid spring sensor arm 58a comprises a T-shaped arm portion 60a pivoted in armature 70'. Attached to the free outer end of arm 60a is an extensible-compressible elongated spring 64a which may be a helically coiled spring suitably anchored at its lower end to the attachment of the flexible closure 16' of the air spring to the shock absorber cylinder 26'.

As shown in FIGURE 5 the air spring casing 12' of each of the two suspension-shock absorber units 10' adapted for positioning abreast of each other on opposite sides of a vehicle, are connected together by a pipe or conduit 134, having a compressed air valved inlet 135, the pipe 134 having a branch conduit 136 opening into a rigid chamber device 138 containing a static air spring positioning bellows capsule 50', as well as space for compressed air and expansion of the bellows, comparable to the bellows chamber arrangement 34 of FIGURE 1. Capsule 50' correspondingly contains a quantity of a condensible gas, such as methyl chloride, in both gaseous and liquid phases. The device 138 is correspondingly provided with a heat sink formed by the walls of chamber 138 with its heat dissipating fins 140 thereon.

Again with reference to FIGURE 4 each unit 10' has a horizontally disposed "tuning fork" or U-shaped rack member 142, the parallel arms 144 of which are disposed adjacent the opposite sides of the upper extension 90' of casing 12' the axis of the rack being so positioned as to extend at right angle to the common axis of the lock-out means 120' in housing extension 90' and to the longitudinal axis of the vehicle on which it is to be mounted. A suitable bracket means 146 to guide and support the single end of the "tuning fork" shaped rack member 142 is provided on the casing 12' externally of the extension 90'. Mounted on the shafts of the diametrically disposed lock-out means 120' and rigid with each of the shafts of the lock-out members 120 exteriorily of extension member 90' is a pinion gear 150 meshing with rack teeth 152 on the respective adjacent portions of the rack member 142. The external support bracket 146 rotatably supports another pinion 154 meshing with another rack-toothed section 156 on rack 142. An inertia or pivoted weight 158 is secured to oscillate with pinion 154 by means of a resilient arm or wand portion 160 formed of spring steel or the like. A suitable abutment block 162 is supported on casing 12 in abutting relation to both the casing 12 and inertia weight 158 when the weight is hanging freely under the action of gravity from its pinion supported by bracket 146. Thus the weight 158, when the unit is mounted on each side of the vehicle, is located between the center line of the vehicle and the abutment block 162 on the casing 12, or inwardly of casing 12'.

Comparable to arrangement in FIGURE 1, battery B in FIGURE 4 is connected, via master switch S', to a conventional reversing switch 87' controlled by the ferrous roller armature having shaft 70' rotatively mounted in the U-shaped magnet 56' of one of the units 10' while spring-loaded mechanical contact closing members are connected to the thermoelectric heat pump 46' in the bellows capsule 50' in chamber 138 of FIGURE 5 reversing switch 87'.

Before use the air spring chambers 18' and casings 138 are suitably charged with compressed air, via the valved inlet 135 on pipe 134 connecting the two suspension units 10' and the shock absorber cylinders 26' are substantially filled with hydraulic fluid.

Assuming an increase in loading on the vehicle on which the fluid suspension-shock absorber units 10' of FIGURES 4 and 5 are mounted, the spring casings 12' slowly descend toward their shock absorber cylinders 26', their air pressures equalizing by means of the connecting pipe 134. As each of the casings 12' descend, a static position sensing coiled spring arm 64a located in only one of the units, becomes compressed due to the bodily lowering of the lever portion 60a. Spring 64 accordingly reacts to pivot T-lever portion 60a counterclockwise in FIGURE 4 since with the slow movement involved the magnet 56' will not, as explained with respect to its counterpart in FIGURE 1, resist rotation of its ferrous roller armature 72' with its nylon bearing means 74 as shown in FIGURE 3. Contact arms 66' and 82' are accordingly closed directing current from battery B through the thermoelectric heat pump 46 of bellows 50' in chamber 34' to heat the condensible gas therein. Resulting extension of the bellows capsule 50' displaces the compressed air under mean static pressure in the chamber 34' in casing 138 (FIGURE 5) causing a build-up in pressure in pipe 134 and the air spring chambers 18' of both suspension-shock absorber units. This increase in pressure in a given chamber 18' is transmitted through restricted orifice 93' to extension control chamber 92'. Since this causes an unbalance of the static positioning of valve-adjusting disc piston 98', initially maintained in its substantially normal mid-position by the differential pressure acting across the bellows seal 108' together with the upward thrust of the spring 110' calibrated, as before, to balance the designed mean or average pressure of the unit acting differentially on opposite sides of piston 98', the latter is forced to move downwardly until the resulting additional compression of spring 108' balances the total pressures acting to immobilize the valve adjusting piston 98' to a new spacial setting. Such movement increasingly restricts the shock absorber piston passages 116', identical with those of the FIGURE 2 construction, to a degree proportional to the heavier vehicle loading.

Conversely, if the vehicle loading is decreased the slow upward resulting movement of casing 12' and the position-sensing lever portion 60a mounted therein extends the coiled spring arm portion 64a to slowly rotate the T contact arm 68' into electrical contact with spring-loaded mechanical contact 86' thereby actuating switch 87' to reverse electrical current flow through the module 46'. This results in a cooling of the condensible gas in the bellows capsule 50' and a resulting contraction thereof and lowering of air pressure in chambers 34', 18' and 92' of both units 10'. As explained previously, the unbalance of pressures now acting in control chamber 92' causes the spring 110' to move the shock absorber valve control piston 98' to move upwardly to a new static position to rotate valve rod 100' to decrease the restriction of shock absorber piston passages 116 proportionately to the change in vehicle loading.

The arrangement in FIGURES 4 and 5 is useful in controlling lateral tilt of the vehicle when turning right or left when under way. For instance, if it be assumed that with the suspension-shock absorber unit 10' in FIGURE 4 mounted on the right side of the vehicle, the vehicle turns right to effect a build-up of centrifugal force to react on pivotal weight 158 which causes it to swing clockwise. This movement causes rack 142 to be slid or moved to the right by rotation and engagement of the pivoted inertia weight-actuated pinion 154 with rack teeth 156, the rack teeth 152 in turn activating pinion 150 to rotate the roller cam arm 148 clockwise which in turn moves the shock absorber valve-controlling piston 98' upward to a degree proportional to the speed of vehicle turning movement. If the developed centrifugal force is sufficient, piston 98' moves to its extreme upward position to fully close the shock absorber piston passages. Under this condition, no relative vertical movement can obtain between the absorber piston 24' and its cylinder 26' and accordingly the unit 10' on the right side of the vehicle, which is on the inner side of the vehicle turn, prevents that side of the vehicle from lifting under the action of centrifugal force during the turning movement. Since the inertia weight 158 of the suspension unit on the left, or outside, of the turn, is prevented from having any swinging movement at this time by its abutment block 162, it permits the suspension unit on which it is mounted to normally function to permit some degree of lowering of the left or outer side of the vehicle while the right or inner side functions as a relatively fixed pivot for such laterally outward tilting of the vehicle that is permitted to take place. For a turn of the vehicle to the left the action is just the reverse of that herein described with respect to a right turn.

During normal straight-ahead movement of the vehicle equipped with the suspension-shock absorber arrangement of FIGURES 4 and 5, should a sudden excessive downward movement of the fluid spring casing 12' occur with an impact effect the pivoted inertia weight 158, though in abuting relation to the abutment 162, due to its vertical position and the resilient wand-like character of its arm member 160, does not react to the impact effect and thereby avoids an upward swinging of its pendulum weight.

From the above description and disclosure it should be apparent that there is herein described, disclosed, illustrated and shown various embodiments or modifications of a novel apparatus, arrangement, method and system for the suspension of the sprung portion of a vehicle from the unsprung portion thereof by means of a variable rate fluid pressure spring-shock absorber means controlled by built-in load-controlled means.

While the invention has been described in terms of certain preferred embodiments or modifications, the scope of the invention should not be deemed to be limited to the precise certain embodiments or modifications herein shown, such other embodiments or modifications being intended to be reserved as they fall with the scope of the claims hereto appended.

What is claimed is:

1. A load supporting mechanism comprising unitary adjustable pressure fluid spring and variable resistance shock absorber devices, said unitary fluid spring and shock absorber devices having means therein responsive only to changes in the static loading thereon to maintain the operational characteristics of said fluid spring and shock absorber structure constant and solely in conformity with said static load changes.

2. A load supporting mechanism as defined in claim 1 wherein said means includes expansible and contractible means to vary the pressure in said fluid spring, and electric means responsive solely to the changes in the static load on said mechanism to actuate said expansible and contractible means.

3. A load supporting mechanism as defined in claim 2 wherein said expansible and contractible means comprises a sealed bellows containing a condensible gas, said sealed being exposed to the interior of said fluid spring, said sealed bellows being changeable in volume when actuated by said electric means to vary its volume and thereby the pressure in said fluid spring.

4. A load supporting mechanism as defined in claim 3 wherein said fluid spring includes a chamber containing said sealed bellows and said sealed bellows includes a protective cap member mounted thereon having a peripheral flange of sufficient length depending around said bellows to provide by engagement with a wall portion of said chamber a substantially sealed enclosure for said bellows when the pressure within said bellows is less than the prevailing pressure existing in the fluid spring.

5. A load supporting mechanism as defined in claim 3, wherein said electric means includes a current reversing switch means responsive to changes in static loading on said mechanism to direct current to said sealed bellows in a direction to effect a change in volume thereof consistent with the change in the loading on the mechanism.

6. A load supporting mechanism as defined in claim 5 wherein said electric means includes a thermo-electric heat pump in said sealed bellows, said heat pump heating the condensible gas in said bellows when current flows in one direction through said reversing switch means with increase in loading and cooling the condensible gas in said bellows when current flows in an opposite direction through said reversing switch means.

7. A load supporting mechanism as defined in claim 6 wherein said fluid spring includes a chamber means of fixed volume said sealed bellows being positioned within said chamber means to limit its expansion to prevent overload on said mechanism, said chamber having heat sink means thereon to dissipate heat developed in the condensible gas of said bellows.

8. A load supporting mechanism as defined in claim 1 wherein said variable resistance shock absorber includes fluid chamber means and fluid resistance means movable therein, one of said last mentioned means having fluid flow control passages therein, said static loading responsive means including valve means having variable flow restricting ports therein controlling fluid flow through said passages, and further means for adjusting said valve means in proportion to the changes in static pressure in said fluid spring.

9. A load supporting mechanism as defined in claim 8 wherein said fluid chamber comprises a cylinder containing hydraulic fluid, said fluid resistance means comprising a piston slidable in said cylinder said piston containing said fluid flow control passages, certain of said piston flow control passages having check valves therein preventing flow of fluid therethrough in one direction, a piston rod secured to said piston and said fluid spring, said further means including relatively movable rod means in said piston rod operable to adjust said flow restricting valve means, and fluid motor means on said fluid spring for actuating said valve adjusting rod means in said piston rod to adjust said valve means.

10. A load supporting mechanism as defined in claim 9 wherein said fluid motor on said fluid spring comprises a sealed cylindrical control chamber, a wall of said control chamber having a restricted fluid flow passage therein connected with the interior of said fluid spring, a second control piston slidably and non-rotatably mounted in said sealed control chamber connected to said valve adjusting rod means, spring means statically positioning said control piston in said control-chamber, means connecting said control piston and said valve adjusting rod means in said piston rod whereby non-rotary movement of said control piston effects rotary adjustment of said flow restricting valve means relative to said piston passages to variably restrict said piston flow control passages.

11. A load supporting mechanism as defined in claim 1 wherein said load means includes an expansible means containing condensible gas in both liquid and gaseous vapor form, said expansible means being in direct communication with said fluid spring device, electrical means for heating and cooling the gas in said expansible means to vary the fluid pressure in said fluid spring device, and reversing switch means directing electrical current through said electrical means in a direction to change the volume of the condensible gas therein to vary the pressure in said fluid spring device and the variable resistance of said shock absorber device solely in response to changes in the static loading on said supporting mechanism.

12. A load supporting mechanism as defined in claim 11 wherein said variable resistance shock absorber device comprises a rectilinear cylinder structure having heat dissipating fins thereon, chamber means on said cylinder structure having heat dissipating fins thereon, said expansible means containing said condensible gas being mounted within said chamber means, said chamber means being of a pre-determined configuration to limit the expansion of said expansible means to prevent pressure overloading of said fluid spring device, said heat dissipating fins forming heat sink means for said shock absorber device and said expansible means.

13. A unitary fluid spring-hydraulic shock absorber mechanism for supporting variable loads thereon, said mechanism comprising a rigid fluid spring casing having a normal static spacial position, a rigid shock absorber casing having variable flow control passages therein and positioned in telescoping relation to said rigid fluid spring casing, flexible closure means between said rigid fluid spring casing and said rigid shock absorber casing to form an enclosed fluid spring chamber in said rigid spring casing, pressurized substantially non-condensible gas in said fluid spring chamber, means responsive solely to variation in static loading on said mechanism to vary the static pressure of the gas in said fluid spring chamber and vary the opening of said variable flow control passages in direct proportion to only the variations in static loading on said mechanism to maintain its operating characteristics uniform and consistent with the changes in the variations in the static loading.

14. A unitary fluid spring-hydraulic shock absorber mechanism as defined in claim 13 wherein said static loading responsive means comprises a control chamber located on said rigid fluid spring casing and having restricted fluid flow connection therewith, a piston in said rigid shock absorber casing having said variable flow control passages therein, valve means variably controlling fluid flow through said variable flow control passages and having an actuating means therefor extending into said control chamber, adjusting means in said control chamber responsive to the varying static pressure in said fluid spring chamber to adjust said valve actuating means directly in response to only the variation in static pressure in said fluid spring chamber, calibrated resilient means statically positioning said means in said control chamber and means sealing said control chamber preventing flow of fluid from said control chamber to said hydraulic shock absorber.

15. A unitary fluid spring-hydraulic shock absorber as defined in claim 14 wherein said static load responsive means solely responsive to variable static loading on said mechanism also includes a chamber having direct communication with said fluid spring chamber, a sealed bellows containing a condensible gas in liquid and gaseous form mounted in said chamber, electric means responsive solely to said variations in static loading to activate said condensible gas to vary the volume of said sealed bellows to thereby vary the fluid pressure in said fluid spring chamber in proportion to said load changes.

16. A unitary mechanism for supporting variable loads thereon, comprising an open-ended rigid fluid spring casing supportingly mounted in telescoping alignment on a hydraulic shock absorber casing having a cylinder therein, resilient closure means extending between and sealingly secured to the open end of said fluid spring casing and said shock absorber casing thereby forming a fluid spring chamber in said spring casing, a piston movable in said shock absorber cylinder, said piston having fluid flow passages therethrough, rotatable valve means for variably controlling flow through said piston passages, a hollow piston rod secured at one end to said piston and at its other end to said rigid spring casing, extension means on said rigid spring casing having a control chamber formed therein, restricted passage means connecting said extension control chamber with said fluid spring chamber, a control piston in said control chamber for adjusting said rotatable valve means, means providing restricted flow from one side to the other of said control piston, rod means connecting said control piston and said rotatable valve means in said shock absorber piston, said control piston in said extension control chamber being longitudinally movable in response to changes in pressure in said spring chamber occasioned solely by variations in static loadings on the device to rotate said rotatable valve means to vary the restriction to fluid flow through said shock absorber piston passage in direct proportion to the variations in static loadings.

17. A unitary mechanism as defined in claim 16 wherein said rod means extends longitudinally through said hollow piston rod, means connecting said rod means and said control piston in said extension control chamber whereby said longitudinal movement of said control piston means effects rotary movement of said rod means and said rotatable valve means.

18. A unitary mechanism as defined in claim 17 wherein a bellows seal is secured in said extension control chambers in surrounding relation to said valve controlling rod means and mounted between said extension chamber control piston and said fluid spring casing to prevent flow of spring casing fluid between said extension control chambers and to said hydraulic shock absorber cylinder structure, spring means positioned in said extension control chamber to statically position and support said control piston means therein.

19. A unitary mechanism as defined in claim 18, said extension control chamber on said fluid spring having cam means therein, means extending exteriorly of said extension control chamber to actuate said cam means manually for engaging and moving said extension chamber control piston to a lock-out position at will whereby said rotatable valve means is rotated to completely close said shock absorber piston passages to prevent flow of fluid therethrough and prevent relative movement of said piston in said shock absorber cylinder whereby said shock absorber functions as a rigid support.

20. A unitary mechanism as defined in claim 18 including cam means mounted in said extension control chamber having shaft means thereon with a portion thereof extending exteriorly of said extension control chamber, gear means fixed on said exteriorly extending portion of said shaft means, rack means engaging said gear means, inertia weight means responsive to externally applied forces mounted exteriorly on said extension control chamber to effect movement of said rack when acted upon by said externally applied forces to thereby actuate said cam means to move said extension chamber control piston towards a lock-out position wherein said shock absorber piston passages are completely closed.

21. A unitary suspension unit as defined in claim 18 wherein said exterior extending means, comprises inertia weight means, said inertia weight means including a pivoted flexible spring arm, an inertia weight secured to the free end of said spring arm whereby said spring arm statically depends vertically, and means connecting said pivoted spring arm to said cam means whereby oscillations of said inertia weighted spring arm correspondingly actuate said cam means in said control chamber.

22. A unitary vehicle suspension unit for supporting variable static vehicle loadings comprising fluid pressure spring means and variable resistance shock absorber means inter-connected together and disposed in axial inter-engaging relation, expansible means including a thermo-responsive condensible gas means to vary the fluid pressure in said fluid spring means and the variable resistance of said shock absorber means, electrical circuit means responsive solely to changes in the static loading on said unit to actuate said thermo-responsive condensible gas means to simultaneously vary the static pressure in said fluid spring means and the variable resistance of said shock absorber means in proportion to the change in static vehicle loading to maintain constant the operating characteristics and the mean relative spacial positions of the fluid spring means and shock absorber means under any static vehicle loading.

23. A unitary vehicle suspension unit as defined in claim 22 wherein said variable resistance shock absorber means comprises a hydraulic device and includes a cylinder having piston means therein, said piston having a piston rod secured to said fluid spring, said piston containing differential fluid flow passages therein, rotary valve means having variable restriction orifices therein controlling flow through said piston passages, means including a rod member connected to said rotary valve and responsive to the changes in static pressure in said fluid pressure spring in response to the changes in static vehicle loadings to rotate said valve means to effect varying restrictions of said differential fluid flow passages in said shock absorber piston whereby the damping action of said shock absorber means is modified in proportion to the static changes in the vehicle loadings to maintain the suspension characteristics of the suspension unit uniform at all times.

24. A vehicle suspension system comprising a plurality of unitary suspension units wherein each unit comprises a pressurized fluid spring means and a variable resistance shock absorber means, the fluid spring means and shock absorber means of each of said units being inter-connected together and disposed in axial inter-engaging relation, conduit means inter-connecting the fluid spring means of all said plurality of suspension units together, said conduit means including an expansible thermo-responsive condensible gas means to simultaneously vary the fluid pressure in all of said fluid pressurized spring means and the variable resistance of the shock absorber means of all of said units, electrical circuit means responsive solely to changes in the static loading on at least one of said units to actuate said thermo-responsive condensible gas means to simultaneously and equally vary the fluid pressure in all of said pressurized fluid spring means and correspondingly the variable resistance of all of said shock absorber means in proportion to the changes in static vehicle loading to maintain the operating characteristics of and the mean relative spacial positions between the fluid pressure spring means and shock absorber means of each unit constant and uniform under any static vehicle loading.

25. A vehicle suspension system as defined in claim 24 wherein said thermo-responsive condensible gas means comprises a chambered structure of predetermined configuration, a sealed expansible bellows in said chambered structure containing condensible gas in both liquid and vapor form, said electrical circuit means including a reversing switch means sealed within said fluid pressure spring means, said shock absorber means comprising cylinder means and piston means reciprocable therein, said piston means having a plurality of through-flow fluid passages therein, check valve means in certain of said passages to prevent flow therethrough in one direction, valve means variably restricting said piston passages, means on said fluid spring means directly responsive to the static variations in pressure in said fluid spring means being operable to adjust said piston valve means to variably restrict said piston passages.

26. A method for supporting variable static loads comprising the steps of pre-determinately resiliently supporting a load by a force in a mean static spacial position, applying yielding resistance to relatively rapid spacial movements of the load away from and towards its mean static spacial position, simultaneously varying the supporting force and the degree of yielding resistance to relatively rapid vertical movements of the load only during any change in static loading until the varied supporting force and the changed degree of yielding resistance to the relatively rapid spacial movements effects return of the changed static load to its initial spacial position and a proportional change in variable resistance to the relatively rapid spacial movements of the changed static load to maintain constant the initial pre-determined character of the resilient support of the load.

27. A method of supporting the spring load of a vehicle from the unsprung portion thereof comprising, the steps of resiliently supporting the sprung vehicle portion at a plurality of points in a mean static spacial position by a load supporting force equalizing the supporting force at all said spaced points, effecting individual yielding resistance to relatively rapid vertical movements of the load away from and towards its means static spacial position, simultaneously varying the supporting force and the degree of yielding resistance to relatively rapid vertical movements of the load only during each change in the static vehicle loading until the varied supporting force and the changed degree of yielding resistance to the relatively rapid vertical movements effects return of the changed static vehicle load to its initial spacial position and a proportional change in variable resistance to the relatively rapid vertical movements of the changed static vehicle load to maintain the initial character of the resilient support of the sprung portion of the vehicle and its relative vertical spacial position the same under any static vehicle loading.

28. In a vehicle fluid spring-shock absorber suspension unit the combination of a rigid cup-shaped fluid spring casing adapted to be secured to the sprung portion of a vehicle, a shock absorber casing having a cylinder therein and positioned in free telescoping relation to said fluid spring casing and adapted to be secured to the unsprung vehicle portion, flexible diaphragm means sealingly connected between said rigid fluid spring casing and said shock absorber casing forming a fluid spring chamber, said spring chamber containing substantially non-condensible gas therein under pressure to form a fluid spring, a valve control chamber formed on said rigid fluid spring casing and having a restricted fluid flow passage therethrough into said fluid spring chamber, piston means in said shock absorber cylinder having fluid flow passage means therein, said piston means including a piston rod secured thereto and extending into and rigidly secured to said rigid fluid spring casing, variable flow control valve means controlling said passage means in said piston means and including a valve actuating member extending into said valve control chamber, a piston freely movable in said valve control chamber, means connecting said actuating member and said piston in said valve control chamber whereby linear movement of said piston effects rotary movement of said valve actuating member, means responsive to changes in the static vehicle loading operable to vary the fluid pressure of said fluid pressure spring in proportion to said changes in said vehicle loading, said varied fluid spring pressure operable by flow-through said restricted passage in said fluid pressure spring to linearly adjust said piston in said control chamber to actuate said shock absorber piston valve to correspondingly vary the damping action of said shock absorber means to maintain the operating characteristics of the suspension unit and the spacial relation of said fluid spring relative to said shock absorber means substantially the same regardless of the amount of change in the vehicle static loadings.

29. In a resilient variable static load supporting arrangement for use between two structures relatively movable toward and away from each other, the combination of a variable static pressure fluid spring and adjustable shock absorbing mechanism, said adjustable shock absorber mechanism having means to vary its shock absorber action, means for controlling said action varying means responsive solely to changes in the static loading on said fluid spring to vary the shock absorber action thereof to maintain the supporting characteristics of said mechanism substantially uniform and constant, said controlling means including means pivotally mounting a control arm member said control arm member having resiliently yieldable and rigid portions responsive to relative movement between the two members, means to prevent pivotal movement of said control arm member until a change in static loading on the mechanism occurs, said last mentioned means comprising eddy current brake means.

30. In a resilient load supporting arrangement as defined in claim 29, wherein said means pivoting said control arm member comprises a magnet, having a channel formed therein, a roller-shaped armature rotatably positioned in said channel of said magnet in rolling contact with the surfaces thereof, non-metallic bearing means on said roller-shaped armature to prevent frictional wearing contact without said magnet channel.

31. In a resilient load supporting arrangement as defined in claim 29 wherein said means pivoting said control arm member comprises a U-shaped magnet, a roller-shaped armature rotatably mounted in rolling contact within the arm portions of said U-shaped magnet, bearing means comprising non-metallic ring means rotatably positioned on the arcuate surface of said roller-shaped armature in frictional contact with adjacent supporting surfaces of said U-shaped magnet.

32. In a resilient load supporting arrangement as defined in claim 31 wherein said control arm member comprises a resilient electrical contact portion secured to said roller armature in juxtaposition thereto and an extended portion thereon, said extended arm portion being substantially rigid in the plane of pivotal movement of the arm member for actuation in said plane of movement by the relative movement between the two structures.

33. In a resilient load supporting arrangement as defined in claim 31 wherein said control arm member comprises a T-shaped electrical contact portion secured to said roller armature in juxtaposition thereto and wherein the two aligned arms of the head of the T form electrical contacts, the third arm of the T comprising a relatively thin resilient spring metal strip first control arm portion of substantially greater width having its greater width disposed at right angle to the plane of its pivotal movement, an extended portion of said resilient metal strip control arm portion being positioned at right angle to the said third arm of the T and disposed in the plane of pivotal movement of said control arm member to form a rigid second arm portion for actuation by engagement with one of the structures in said plane of movement by the relative movement between the two structures.

34. In a resilient load supporting arrangement for use between two structures relatively movable toward and away from each other, the combination of resilient fluid spring means having fluid chamber means and variable fluid flow shock absorber mechanism, said fluid spring having valve controlled port means for admitting a gaseous medium under pressure into said fluid spring chamber, said mechanism having means responsive solely to changes in static loading thereon to maintain the resistance to fluid flow in said flud flow shock absorber mechanism directly proportional to the static fluid pressure in said fluid spring chamber means, said means including variable fluid flow control means in said shock absorber, means responsive solely to changes in static pressure in said fluid spring chamber means to adjust the variable fluid flow control means in said shock absorber in proportion to said changes in static pressure in said fluid spring chamber means to dampen the relative movements of the two structures.

35. The construction as defined in claim 34 wherein said shock absorber mechanism is mounted in axial alignment with said fluid spring means, said means further comprising chamber means having restricted fluid flow connecting means with said fluid spring means, means in said chamber means responsive solely to changes in the static fluid pressure in said fluid spring means to vary the resistance to fluid flow in said variable fluid flow shock absorber mechanism to dampen the relative movements of the two structures in proportion to the changes in static fluid spring pressure.

References Cited by the Examiner

UNITED STATES PATENTS

| 2,698,068 | 12/1954 | Hein | 188—87 |
|---|---|---|---|
| 2,921,160 | 1/1960 | Lautzenhiser. | |
| 3,000,624 | 9/1961 | Cislo. | |

FOREIGN PATENTS

| 571,871 | 1/1958 | Italy. |
|---|---|---|
| 597,042 | 8/1925 | France. |

BENJAMIN HERSH, *Primary Examiner.*

LEO FRIAGLIA, A. HARRY LEVY, *Examiners.*